(12) United States Patent  
Narayanan et al.

(10) Patent No.: US 10,713,662 B1  
(45) Date of Patent: Jul. 14, 2020

(54) ARTIFICIAL INTELLIGENCE BASED IDENTIFICATION AND DATA GATHERING OF INCOMPLETE INTERACTIONS AND AUTOMATICALLY CREATING TASKS TO TAKE IT TO COMPLETION

(71) Applicant: Avaya Inc., Santa Clara, CA (US)

(72) Inventors: Lakshmi Narayanan, Chennai (IN); Prem Kumar Bhavnani, Pune (IN); Harshad R. Apshankar, Kothrud (IN)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 16/285,448

(22) Filed: Feb. 26, 2019

(51) Int. Cl.  
*H04M 3/51* (2006.01)  
*G06Q 10/06* (2012.01)  
*G06Q 30/00* (2012.01)

(52) U.S. Cl.  
CPC ..... *G06Q 30/016* (2013.01); *G06Q 10/06316* (2013.01); *H04M 3/5175* (2013.01); *H04M 3/5183* (2013.01)

(58) Field of Classification Search  
CPC .......... G06Q 30/016; G06Q 10/06316; H04M 3/5175; H04M 3/5183  
USPC ............ 379/265.09, 265.05, 265.06, 265.11, 379/265.01  
See application file for complete search history.

(56) References Cited

U.S. PATENT DOCUMENTS

2015/0227941 A1* 8/2015 Tuchman ............ H04M 3/5166 705/7.14  
2017/0324868 A1* 11/2017 Tamblyn ............ H04M 3/5191  
2018/0191905 A1* 7/2018 McCoy ................ G06Q 30/016

OTHER PUBLICATIONS

Goebel, Tobias; (Jun. 26, 2017); CMSWIRE; "How Robotic Process Automation Fits in Your Contact Center" ; Retrieved May 23, 2019, from https://www.cmswire.com/digital-experience/how-robotic-process-automation-fits-in-your-contact-center/.

(Continued)

*Primary Examiner* — Thjuan K Addy  
(74) *Attorney, Agent, or Firm* — Stevens & Showalter LLP

(57) ABSTRACT

One aspect of the present invention relates to a computer-implemented process, that includes receiving an incoming contact at a contact center for an interaction between the contact center and a user; monitoring inbound communication and outbound communication between the user and an agent of the contact center; detecting that one of the agent or the user ends the contact; and based on the monitored inbound communication and outbound communication, automatically determining, by the computer, whether the interaction is complete.

16 Claims, 4 Drawing Sheets

(56) References Cited

OTHER PUBLICATIONS

Dean, Kevin; (Jun. 27, 2018); MANOBYTE; "Whats the Future of the Phone in Customer Support?" ; Retrieved May 23, 2019, from https://www.manobyte.com/customer-service-and-the-future-of-phone-support.
SPICECSM; "Robotic Process Automation in the Contact Center" ; Retrieved May 23, 2019, from http://www.spicecsm.com/blog/robotic-process-automation-contact-center.
Wilson, James W.; Call Center Pros, LLC; "What is Robotic Process Automation (RPA) for Contact Centers?" ; Retrieved May 23, 2019, from https://www.linkedin.com/pulse/what-robotic-process-automation-rpa-contact-centers-james-wilson/.
Frost & Sullivan; (Oct. 4, 2017); "Utilizing Robotic Process Automation in Contact Centers Reduces Costs and Increases Operational Efficiencies"; Retrieved May 23, 2019, from https://ww2.frost.com/news/press-releases/utilizing-robotic-process-automation-contact-centers-reduces-costs-and-increases-operational-efficiencies/.
Selmer, Roland; (Mar. 29, 2017); Nexmo; "How Artificial Intelligence in the Contact Center Will Work"; Retrieved May 23, 2019, from https://www.nexmo.com/blog/2017/03/29/artificial-intelligence-contact-center/.

\* cited by examiner

ARTIFICIAL INTELLIGENCE BASED IDENTIFICATION AND DATA GATHERING OF INCOMPLETE INTERACTIONS AND AUTOMATICALLY CREATING TASKS TO TAKE IT TO COMPLETION

BACKGROUND

The present disclosure relates generally to a contact center environment, and, more particularly, to managing interactions that may be only partially completed during an initial communication session.

In a typical contact center, there may be instances when a customer interaction is not entirely complete and might require follow ups. For example, in the case of an inbound voice interaction, an agent may update the current status of an issue and inform the customer that the agent or another agent shall get back to them later. This situation can occur irrespective of the channel or media of interaction. Currently there is no mechanism to track the follow up required for an interaction automatically.

BRIEF SUMMARY

One aspect of the present invention relates to a computer-implemented process, that includes receiving an incoming contact at a contact center for an interaction between the contact center and a user; monitoring, by a computer, inbound communication and outbound communication between the user and an agent of the contact center; detecting, by the computer, that one of the agent or the user ends the contact; and based on the monitored inbound communication and outbound communication, automatically determining, by the computer, whether the interaction is complete. In particular, the incoming contact can be one of a voice call, a video call, a chat session, a social media message, a short message service (SMS) message, or an electronic mail.

In accordance with this aspect, the process also includes when the interaction is an incomplete interaction, identifying by the computer, one or more tasks to complete the incomplete interaction and tracking, by the computer, a status of the one or more tasks. Furthermore the process includes determining, by the computer, each of the one or more tasks is completed and then determining that the incomplete interaction is completed. In some instances, the process can include assigning, by the computer, one of the one or more tasks to a separate computer application of the contact center or one or more of the agent or a supervisor of the agent. As an example, the separate computer application can include a customer relationship management system.

Also in accordance with this aspect, automatically determining whether the interaction is complete comprises performing artificial intelligence based analysis of at least one of the inbound communication and the outbound communication.

The process can also include soliciting feedback that can include: a) requesting, by the computer, feedback from the user about the interaction; and/or b) requesting, by the computer, about a status of execution of the task from one or more of the agent, a supervisor of the agent, or an entity assigned one of the one or more tasks.

Another aspect of the present invention relates to a system in a contact center wherein an incoming contact is received at the contact center for an interaction between the contact center and a user. The system includes a memory storing executable instructions and a processor in communication with the memory. In particular, the processor when executing the executable instructions is configured to: monitor inbound communication and outbound communication between the user and an agent of the contact center; detect that one of the agent or the user ends the contact; and based on the monitored inbound communication and outbound communication, automatically determine whether the interaction is complete. The incoming contact can be one of a voice call, a video call, a chat session, a social media message, a short message service (SMS) message, or an electronic mail.

In accordance with this aspect, when executing the executable instructions the processor is configured to, when the interaction is an incomplete interaction, identify one or more tasks to complete the incomplete interaction and track a status of the one or more tasks. Furthermore, when executing the executable instructions the processor is configured to determine each of the one or more tasks is completed and then determine that the incomplete interaction is completed.

Additionally, when executing the executable instructions the processor is configured to assign one of the one or more tasks to a separate computer application of the contact center or one or more of the agent or a supervisor of the agent. In particular, the separate computer application can be a customer relationship management system.

In accordance with this aspect, automatically determining whether the interaction is complete comprises performing artificial intelligence based analysis of at least one of the inbound communication and the outbound communication.

Additionally, when executing the executable instructions the processor is configured to request feedback from the user about the interaction and/or request a status of execution of the task from one or more of the agent, a supervisor of the agent, or an entity assigned one of the one or more tasks.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

Figure 1:
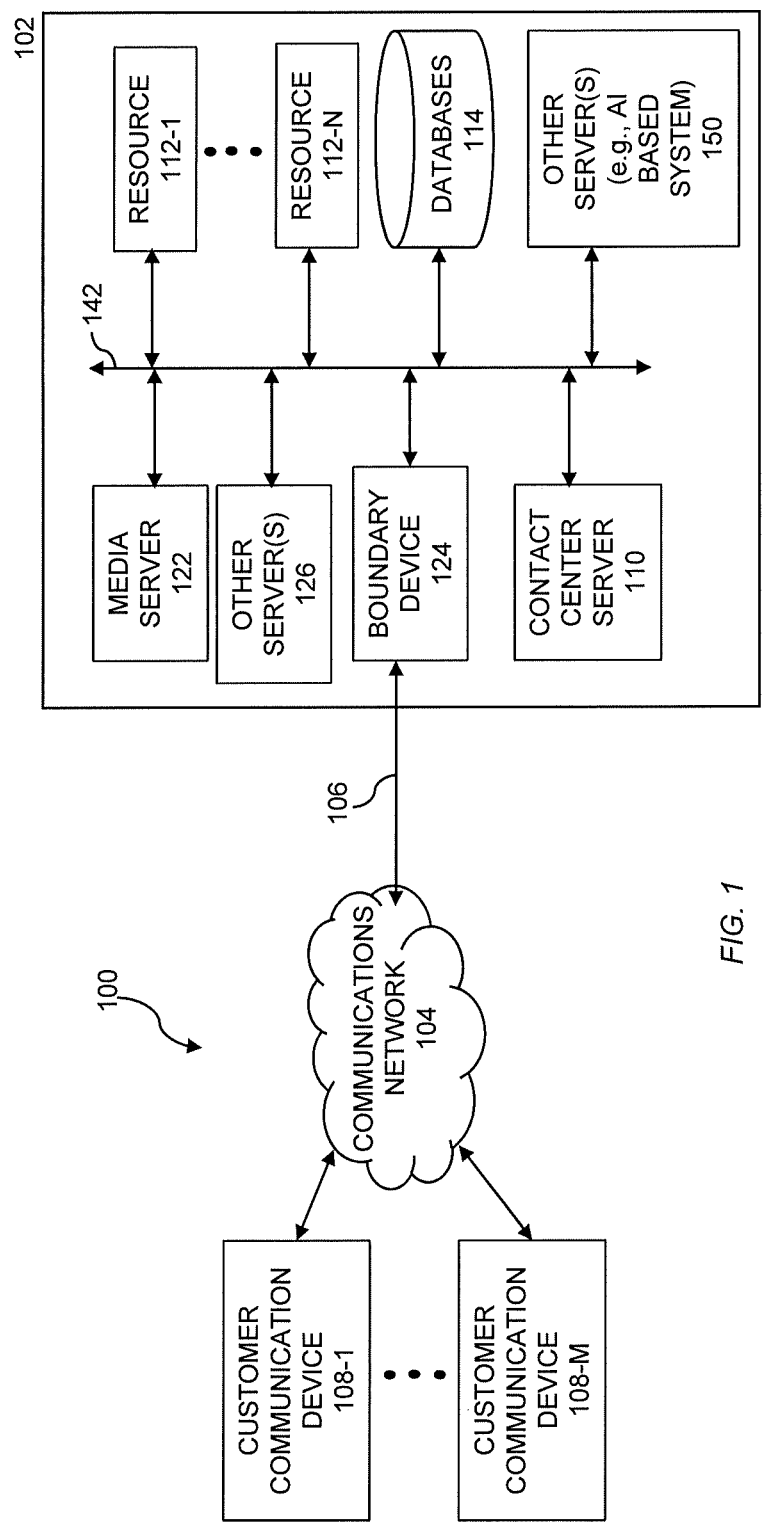
FIG. 1 and FIG. 2 provide an example contact center environment and are provided to illustrate a typical computer-based enterprise architecture in which embodiments in accordance with the present disclosure can be implemented.

Embodiments of the present invention will be illustrated below in conjunction with an exemplary communication system, e.g., the Avaya Aura® system. Although well suited for use with, e.g., a system having an Automatic Call Distribution (ACD) or other similar contact processing switch, embodiments of the present invention are not limited to any particular type of communication system switch or configuration of system elements. Those skilled in the art will recognize the disclosed techniques may be used in any communication application in which it is desirable to provide improved contact processing.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

In the present description, an "agent" and a "resource" can both be used to describe a person working at the contact center handling contacts.

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to email or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communication from a user or a customer. The communications may be by way of any communications medium such as, but not limited to, a telephone call, email, instant message, web chat, and the like. The terms "user" and "customer" denote a party external to the contact center and are used herein to refer to the other party to a contact or a communications session. A user or customer may include, for example, a person having a commercial relationship with the contact center or with a business represented by the contact center.

For each contact received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed. For the sake of brevity, the term "contact" is sometimes used to mean a "contact object" when it is clear from the context that a computer or processor is automatically interacting with or manipulating the contact object.

The terms "determine," "calculate," and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated that those individual aspects of the present disclosure may be separately claimed.

The terms "switch," "server," "contact center server," or "contact center computer" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like. One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions, such as voice, video, and/or instant messaging, and may be used with other IETF protocols to build multimedia architectures including Real-Time Transport Protocol (RTP), Real-Time Streaming Protocol (RTSP), Media Gateway Control Protocol (MEGACO), and the Session Description Protocol (SDP).

Figure 2:
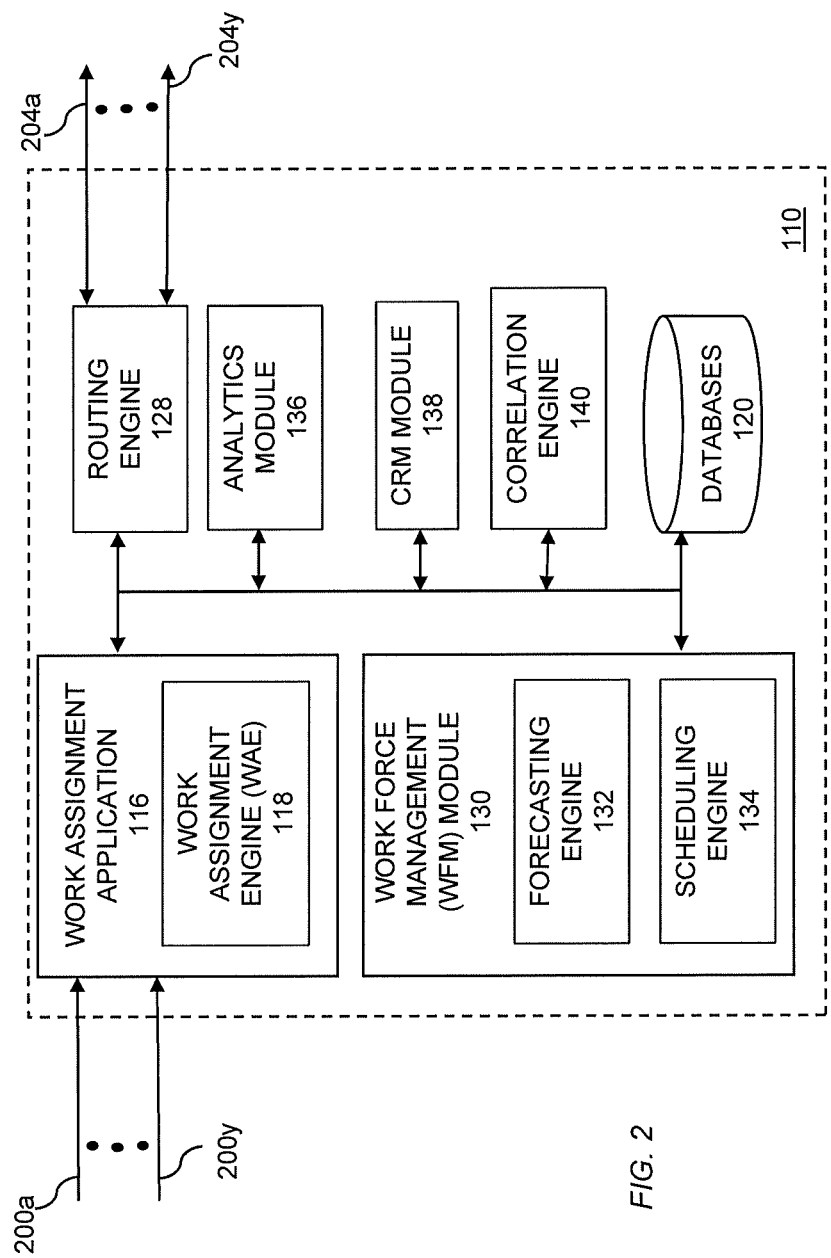

FIG. 1 and FIG. 2 provide an example contact center environment and are provided to illustrate a typical computer-based enterprise architecture in which embodiments in accordance with the present disclosure can be implemented.

FIG. 1 shows an exemplary embodiment of a communications system 100 according to the present disclosure. The communications system 100 may comprise a communications network 104 connecting components of a contact center 102 via a communications link 106 to one or more customer communication devices 108-1 to 108-M, where M is an integer, M≥1 (referred to herein collectively as a customer communication device 108). Each customer communication device 108 may be associated with a contact or customer and may comprise, for example, a cellular phone, computer, Personal Digital Assistant (PDA), digital or analog phone, and the like. The communications network 104 may comprise any type of known communication medium or collection of communication media and may use any type of protocols to transport messages between endpoints. The communications network 104 may be packet-switched and/or circuit-switched and may include wired and/or wireless technologies.

The contact center 102 may comprise, for example, a boundary device 124, a central contact center server 110, a media server 122, one or more other servers 126, and a set of data stores or databases 114. The additional servers 126 may include, for example, an Interactive Response unit (IVR), a voice portal, a video call server, an email server, and the like. Some or all of the components of the contact center 102 may be interconnected by an internal network 142 such as a local area network (LAN) or WAN. One or more of the components of the contact center 102 may also be connected via one or more optional communications links (not shown) to one or more other components of the contact center 102.

Although depicted as separate servers and/or applications that are co-located with one another, it should be appreciated that such a configuration of components is not required. For example, some or all of the functions depicted in FIG. 1 may be co-hosted and/or co-resident on a single server and/or processor, e.g., the contact center server 110, and/or two or more of the contact center 102 components may be distributed and connected to one another over the communication network 104, with the communications between these components may be secured with tunneling protocols or a Virtual Private Network (VPN; not shown). In addition, although one central contact center server 110 is depicted in FIG. 1, two or more servers 110 may be provided in a single contact center 102 or across multiple separate LANs 142 owned and operated by a single enterprise, but separated by the communications network 154. Likewise, two or more media servers 122 may be provided in the contact center 102. In configurations where the contact center 102 includes two or more servers 110 and/or media servers 122, each server 110, 122 may comprise similar functionality, but may be provisioned for providing its features to only a subset of all contact center users.

A customer associated with a customer communication device 108 may utilize the device 108 to generate and transmit a communication, such as a telephone call, an email message, an instant message (IM), an SMS message, etc., over the communications network 104, which is received as a contact at the contact center 102. The contact may be received at the boundary device 124, which maintains a secure separation between the communication network 104 and the internal network 142 and facilitates communications between the customer communication device 108 and the contact center 102. The boundary device 124 may include the functionality of one or more of a switch, a computer-telephony integration (CTI) interface, a SIP gateway, a security gateway, a firewall, a router, or the like. A boundary device 124 comprising a SIP gateway may, for example, connect with one or more SIP trunks from the communications network 104 and split incoming aggregate SIP traffic into individual SIP sessions and aggregate the individual outbound SIP sessions. The boundary device 124 may be implemented as hardware such as via an adjunct processor (as shown) or as a chip in the contact center server 110 (not shown).

Following receipt at the contact center 102, a contact object is instantiated for each contact as described herein and the contact objects are distributed to a plurality of resources 112-1 to 112-N, wherein N is an integer, N≥1 (referred to collectively herein as resource 112). Each resource 112 represents a processing resource of the contact center 102 and may comprise completely automated resources (e.g., processors, servers, or the like), human resources utilizing communication devices (e.g., human agents utilizing a computer, telephone, laptop, etc.), or any other resource known to be used in a contact center 102. In some embodiments, contact objects may be assigned to the IVR (not separately labeled), a voice portal (not separately labeled), or other component of the contact center 102 for automated customer service processing prior to or simultaneous with assigning the contact object to a human resource (e.g., a contact center agent). For example, the voice portal and the IVR may work together to provide IVR services to the contacts.

Each resource 112 may be associated with a resource communication device (not shown), which may be a packet-switched device such as a computer workstation, an IP hardphone or softphone, a packet-based H.320 video phone and conferencing unit, a packet-based voice messaging and response units, a packet-based traditional computer telephony adjunct, a peer-to-peer based communications device, and/or any other suitable communications device. These packet-switched devices may be SIP compatible. The resource communication device may also comprise circuit-switched devices that each correspond to one of a set of internal extensions and may include, for example, wired and wireless telephones, voice messaging and response units, traditional computer telephony adjuncts, and any other suitable communications device.

With reference to FIG. 2, the contact center server 110 may further comprise a work assignment application 116, a routing engine 128, a work force management (WFM) module 130, an analytics module 136, a customer relationship management (CRM) module 138, a correlation engine 140, and one or more database(s) 120. Although each of these functions is depicted in FIG. 2 as residing on the contact center server, it should be appreciated that one or more of the functions, such as the routing engine 128, may reside elsewhere and/or be executed by another server/engine.

Each contact object may comprise one or more work items and generally comprises at least a request for a resource 112. The format of each work item may depend upon the capabilities of the communication device 108 and the format of the communication. In particular, work items are logical representations within the contact center 102 of work to be performed in connection with servicing a particular contact received at the contact center 102 (and more specifically at the work assignment application 116). Work items may be received at the work assignment application 116 from the customer communication devices 108 via one or more customer communications lines or channels 200a to 200y (which may be one or more trunks, phone lines, etc.) and maintained at the work assignment application 116, a switch or server connected to the work assignment application 116, or the like until a resource 112 is assigned to the work item. As described below, the channels of the contact center can comprise multiple different mediums such that an interaction or contact may occur over multiple types of channels. The work assignment application 116 comprises a work assignment engine 118 that enables the work assignment application 116 to make intelligent routing decisions for work items. As used herein, assignment and/or routing of a contact or contact object to a resource and association of contact attributes with the contact or contact object are intended to be synonymous with assignment and/or routing of the work item(s) associated with the contact or contact object to a resource and association of contact attributes with the work item(s).

The work assignment engine 118 may determine which of the plurality of processing resources 112 is qualified and/or eligible to receive the work item and further determine which of the plurality of processing resources 112 is best suited to handle the processing needs of the work item. In situations of a work item surplus, the work assignment engine 118 may also determine an optimal assignment of a work item resource to a particular resource, e.g., resource 112-1. In some embodiments, the work assignment engine 118 may be configured to achieve true one-to-one matching by utilizing bitmaps/tables and other data structures. Following assignment of the resource 112-1 to a work item, the work assignment application 116 passes the work item to the routing engine 128 to connect the customer communication device 108 that initiated the communication with the assigned resource 112-1 via one of a plurality of resource communications lines 204a to 204y (which may be a voice-and-data transmission line such as a LAN 142 and/or a circuit switched voice line).

The WFM module 130 may be configured to manage the workforce of the contact center 102 (namely the human resources 112). The WFM module 130 may comprise a variety of functionalities, such as a forecasting engine 132 and a scheduling engine 134, that operate together to achieve optimal management of the workforce. The forecasting engine 132 may monitor current work item volume, current resource availability/utilization, past work item volume, past resource availability/utilization, estimated wait times, service levels, and other objectives and provides a forecast or estimate of the work item volume and required staffing levels in the contact center 102 for a desired shift period. For example, the forecasting engine 132 may be configured to monitor one or more Service Level Agreements (SLAs) between the contact center 102 and one or more clients or customers of the contact center 102 to ensure compliance with the applicable SLA(s).

The scheduling engine 134 uses the information provided by the forecasting engine to schedule human agents, e.g., resources 112, to work in the contact center 102. Additionally, the forecasting engine 132 may automatically identify future resource availability issues (in the short-term or long-term) and notify the scheduling engine 134, thereby enabling the scheduling engine 134 to adjust the scheduling of resources 112 as necessary. In some embodiments, the forecasting engine 132 is capable of analyzing prior and current contact center performance to determine if the contact center 102 will require more or less resources 112 at any particular time, e.g., the beginning or end of a calendar month. The scheduling engine 134 may also be configured to monitor schedule adherence, social media activity, and the like, and the WFM module 130 may enable shift bidding, schedule adjustments, work-at-home resource re-scheduling, and the like.

The analytics module 136 may be utilized to track trends and generate one or more reports that indicate agent performance and overall performance of the contact center 102. In some embodiments, the analytics module 136 may be configured to pull data stored in one or more databases 114, 120 and prepare the data in a human-readable format. The database(s) 114, 120 may be configured to store information about any or all components of the contact center 102 such as statistics related to the WFM module 130 (e.g., resource utilization, compliance with SLA agreements, compliance with objectives, etc.), resource performance statistics (e.g., Key Performance Indicators (KPIs)), and statistics related to the WAE 118 (e.g., decisions per time period, successful routing decisions, estimated wait time, etc.). Advantageously, the analytics module 136 may be configured to run one or more reports for predefined data automatically at predefined intervals. The analytics module 136 may also be enabled to run ad-hoc reports based on inputs received from a contact center administrator or manager. Further still, the analytics module 136 may be configured to run reports in response to a predetermined event or series of events occurring in the contact center 102.

The CRM module 138 may be configured to collect and manage historical customer information, current customer information, information related to interactions between a customer and a contact center 102, customer preferences, customer purchase history, customer return history, customer aliases (e.g., in social media networks), and the like. Such information may be stored and maintained in one or more of the database(s) 114, 120. The CRM module 138 may be utilized to help the contact center 102 provide a more robust and personalized customer service experience. In some embodiments, the CRM module 138 may retrieve desired CRM information from the database(s) 114, 120 to enable one of the resources 112 to more efficiently process a work item for a returning or known customer. For example, when a work item is received in a contact center 102 and the work item is associated with a customer having historical information stored as CRM information in one of the databases 114, 120, the CRM module 138 may retrieve some or all of the CRM information and provide the retrieved information to a resource 112, thereby enabling the resource 112 to provide a more personalized service to the customer.

In some embodiments, the contact center server 110 and its various functionalities may be configured to administer and make work assignment decisions in a queueless contact center, as described in U.S. Pat. No. 8,634,543, the entire contents of which is hereby incorporated herein by reference.

In other embodiments, the server 110 may be configured to execute work assignment decisions in a traditional queue-based (or skill-based) contact center, as described in U.S. Pat. No. 8,234,141, the entire contents of which is hereby incorporated herein by reference. Skill-based contact centers may maintain a resource profile, which includes information related to each resource's skills, level(s) of skill expertise, and training, as well as metrics associated with a plurality of work items serviced by the resource for each resource skill (e.g., contact type, duration, and resolution, ratings from the customer and/or a supervisor, etc.). The resource profiles may be stored, for example, in one or more contact center database(s) (e.g., 114, 120 in FIGS. 1 and 2). This resource information is used to assign each resource to one or more skill groups or resource queues (not shown). When a new contact is received at a skill-based contact center, information about the contact is determined, such as the customer's identity and current needs, customer value, and the resource skill that is required for the proper handling of the contact, and this information, along with additional data such as current contact center queue lengths, is used to assign each new contact to a work item queue (not shown). Some of the information related to the one contact may be maintained in a customer profile, which may also be stored, for example, in one or more contact center database(s) (e.g., 114, 120 in FIGS. 1 and 2). Contacts are assigned to resources based on a comparison of the resource skill required to service the contact and the skillset(s) of each resource. Other servers and applications 150 may also be provided within the contact center. As explained in detail below, one example server 150 can include an AI based system used to create, track, and close multiple tasks for a customer interaction which may span across multiple contacts, multiple channels and multiple systems within or external to the contact center which allows for the linking together of multiple tasks associated with a customer interaction across contact center systems for a single interaction.

In further embodiments, the server 110 and its various functionalities are configured to execute work assignment decisions in an attribute-based contact center, such as a contact center using the Avaya Oceana™ Solution. Similar to a skill-based contact center, attribute-based contact centers gather information about customers and assign each contact to a resource based on matching between customer and resource data. However, attribute-based matching provides a match based on a plurality of individual attributes of the contact and the resource, as opposed to matching based on a single "skill" assigned to the contact in a traditional skill-based setting. Attribute-based matching provides more details about the contacts and delivers a greater degree of granularity than traditional skill-based matching, which permits more accurate forecasting of future needs.

In a typical contact center, there may be instances when a customer interaction is not entirely complete and might require follow ups. For example, in the case of an inbound voice interaction, an agent may update the current status of an issue and inform the customer that the agent or another agent shall get back to them later. This situation can occur irrespective of the channel or media of interaction. Currently there is no mechanism to track the follow up required for an interaction automatically. Thus, the term "interaction" as used herein encompasses more than merely a specific communication session that may terminate without an issue being entirely resolved. An interaction can include multiple individual communication sessions that can occur with different agents or at different times during the same day or different days. An interaction also can encompass different types of communication media. Accordingly, an interaction is not necessarily considered "complete" even though an agent or the user terminated a session or disconnects from the session. An interaction is complete when no additional data gathering or tasks need to be accomplished to address the issue(s) that are the subject of the interaction.

An agent will typically mark the contact as completed in the contact center system and possibly create tasks for one or more business transactions in a Customer Relationship Management (CRM) system. The agent may or may not create all of the tasks related to the interaction. The supervisor or administrator may not know that the interaction is not fully complete or will have to track open business transactions manually through the CRM system. In a case where the customer contacts the contact center for a follow up on the matter after a few days, the contact may or may not reach the same agent and this could lead to delayed service delivery for the customer and can impact customer satisfaction in a contact center. This shortcoming can be compounded when interactions involve multiple, different business units making it difficult to tie tasks to the original incoming interaction.

Conventional solutions rely on an agent's wrap up codes that they enter into the contact center system to track interaction status and that status information may not fully reflect the details of the follow-up actions or business transactions still needing to be completed. Custom integration to map customer interaction with business transactions requires manual intervention and is subject to human errors. For example, under heavy contact volume, an agent may choose to defer creation of follow-up business transactions to a later time and may either forget to create them or may make errors when creating it later due to loss of contextual information. The manual integration of this type involves static codes and does not have any built-in intelligence to dynamically create, track or adjust follow-up tasks.

Embodiments in accordance with the present disclosure contemplate an artificial intelligence (AI) based system 150 which defines a customer interaction as a data entity or data record that is more than simply an inbound/outbound voice/email/chat/social contact so as to encompass related information such as, for example, follow-up tasks, business transactions, and additional data gathering from the customer. As an example, a business transaction can start when a user calls the contact center regarding some software and hardware they are purchasing. In particular, the user inquires about an advanced version of the software. In response, the agent may reply that the advanced version of the software will need additional hardware. As a result, the user will likely inquire as to how much extra will the additional hardware cost. The presently contemplated AI based system 150 will recognize the interaction is incomplete and create a task to send an updated quote, highlighting the difference from the original quote to the user. The AI based system 150 can also create another task to follow up with the user to see if the user wants to go ahead with the new configuration, and to update the order accordingly. This could lead to multiple related sessions (manual as well as automated) between the user and the agent before the interaction is deemed to be completed.

The AI based system 150 can observe and analyze the customer interaction (for example, an inbound/outbound voice/email/chat/social/custom) to identify a status of the customer interaction for completeness and for any need for follow-up tasks—be it business transactions, contact follow-up, data gathering from the customer, etc. As an example, the interaction may start with a user submitting a written message that results in the call center agent providing comments such as, for example, review comments. The presently contemplated AI based system 150 can create a task that ensures the review comments are incorporated into the original message, create a task to provide an updated status to the user and the reviewing agent, and create a task to share the updated document to stakeholders for further review.

When the AI system determines that the interaction is not complete, it can identify and create required follow-up tasks in the contact center system 110 or CRM system or module 138 as needed and track them through completion. Follow-up tasks may also be created and assigned to call center agents and supervisors of the agents. For example, the task can involve contacting the customer to gather additional data to complete a business transaction. Existing contact center systems or CRM systems can still be used for task life-cycle management. However, the presently contemplated AI based system 150 can track progress, alert stakeholders, adjust status indicators, add more tasks, intelligently use data gathered for one task for another to automate the process and minimize manual intervention thereby improving accuracy, completeness and customer satisfaction.

Additionally, the customer may have an option to provide feedback about progress or completeness of the interaction to their satisfaction. One of ordinary skill in this field will recognize that this feedback may be used to further fine tune the AI algorithms (either manually or through automatic self-learning) to enhance the overall system accuracy. Similarly, the contact center agents or supervisors may also have an option to provide feedback about task dependencies, pre-requisites, and data needed from the customer. The agent and supervisors may also be asked to provide information about the status of execution of any tasks that they may have been assigned. As mentioned above, this feedback may be used to further fine tune the AI algorithms used to enhance the overall system accuracy.

In an example involving an inbound voice interaction, a real time speech analyzer can capture the audio of the interaction and determine what words are being said during the conversation. Based on the content of the conversation, the AI based engine 150 can identify whether the interaction is complete or not at the end of the conversation. One of ordinary skill in this field will recognize that conventional natural language processing (NLP) techniques and algorithms can be used to determine whether or not the interaction appears to be complete at the end of the conversation. As an example, the agent can use words and phrases that NLP can recognize as indicative of the need for one or more follow ups in order to complete the interaction. Also, the customer can use words and phrases that NLP can recognize as indicative that they have no further questions or issues to resolve.

If the AI based system 150 determines that the interaction is not complete, then follow-up tasks can be created such as, for example, a) call back to the customer after three days to connect the customer with the same agent and/or b) send the status of the customer issue via SMS\Email to the customer.

Similarly, for an Email or Chat conversation between a customer and an agent, the text of the conversation can be parsed and the AI based system 150 can identify whether the interaction is complete or not by analyzing the full email messages or chat transcripts. If the system determines that the interaction is not complete, then follow-up tasks would be automatically created. For example, one follow-up task can include getting feedback from the customer to indicate whether the interaction is complete to the customer's satisfaction or not. The contact center system 110 and the CRM system or module 138 can communicate with the AI based system 150 in order for follow-up task creation to be performed automatically by the AI based system 150. As merely one example, the contact center system or the CRM system can provide an application programming interface (API) that allows the AI based system to automatically create a follow up task on either of the systems.

Thus, embodiments in accordance with the principles of the present disclosure contemplate automated interaction management in a contact center through an AI based system used to create, track, and close multiple tasks for a customer interaction which may span across multiple contacts, multiple channels and multiple systems within or external to the contact center which allows for the linking together of multiple tasks associated with a customer interaction across contact center systems for a single interaction.

Figure 3:
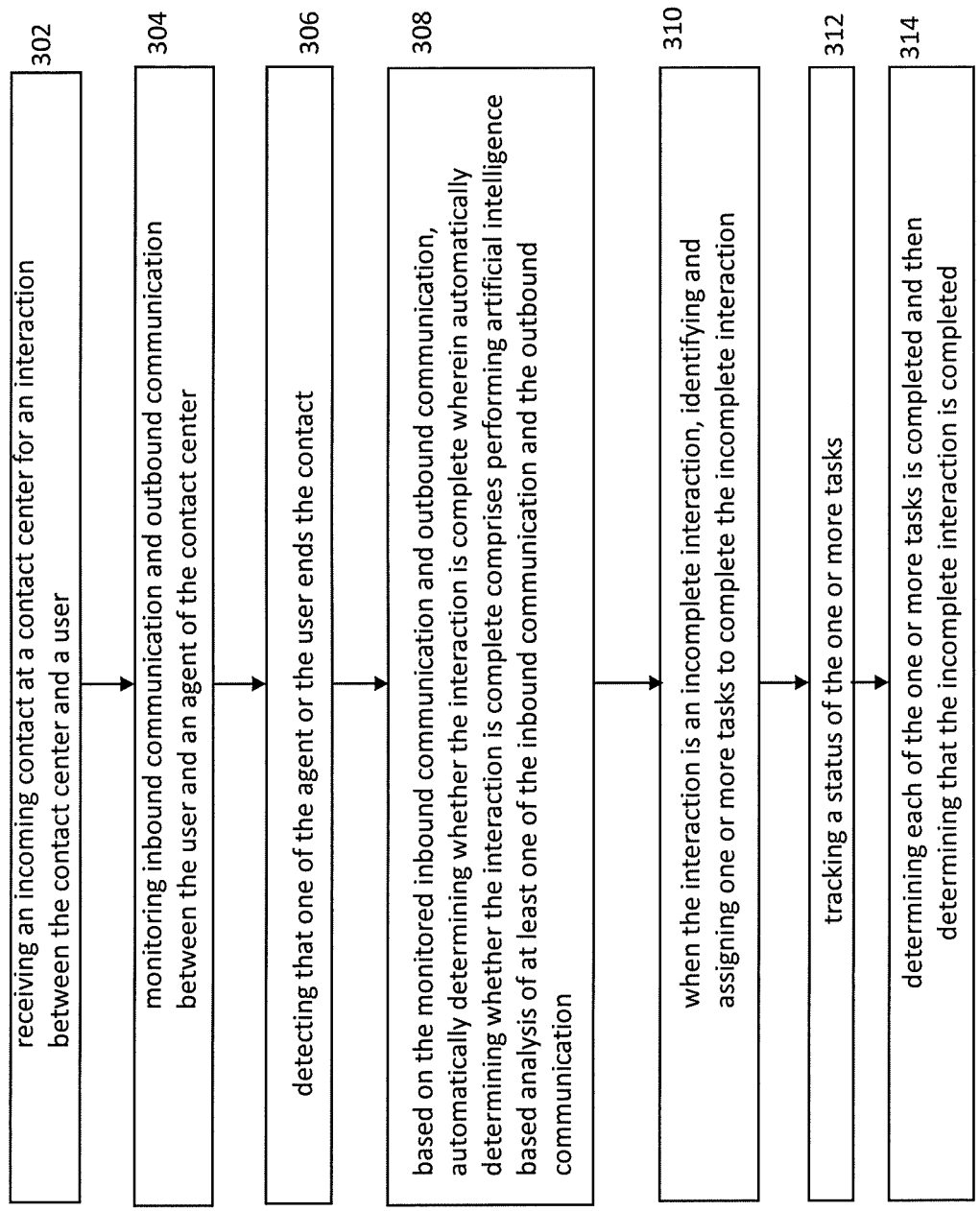
FIG. 3 depicts a flowchart of an example process in accordance with the principles of the present disclosure.

FIG. 3 is a high-level flowchart of an example process in accordance with the principles of the present disclosure. Digital contacts as used herein refer to textual contacts such as from chat, email, social media, and SMS. Additionally, a transcript of a real-time voice interaction or an incoming voicemail could be created using speech-to-text and processed as a textual contact as well. Furthermore, as future and additional digital channels are developed and implemented the principles of the present invention can be applied to messages in those channels as well.

Thus, in step 302, an incoming contact is received at a contact center (e.g., by a contact center server 110 or a multimedia contact center application) that is for an interaction between the contact center and the user. The AI based system 150 can monitor or analyze, in step 304, the inbound communication and/or outbound communication occurring between the user and the contact center such as, for example, between the user and an agent of the contact center. In step 306, the AI based system 150 can detect when either the user or the agent ends the contact. The steps of 304 and 306 can vary based on the type of contact that occurs. For voice calls (or video calls), real time speech analysis can be performed to determine the content of the ongoing interaction until either party terminates the call. For digital contacts, the text of messages that are exchanged can be monitored and analyzed.

In step 308, the AI based system automatically determines whether the interaction is complete based on the monitored inbound and outbound communication. As mentioned above, NLP techniques can be used to analyze the communications or the conversation to determine whether or not it appears that follow up items are mentioned during the initial interaction. In another example, a web-based form or social media submission page can be used for which the format of the inbound communication is known and for which a predetermined response or action is already defined. The AI based system can then extract the submitted information and take the steps to initiate the predetermined response or action. In addition to the AI based system automatically determining whether or not the interaction is complete, an agent or supervisor can manually flag the interaction as being incomplete.

When the AI based system determines the interaction is an incomplete interaction, then the AI based system identifies, in step 310, one or more tasks to complete the incomplete interaction. In addition to simply identifying the one or more tasks, the AI based system can communicate with other servers and systems of the contact center so as to assign the tasks or to accomplish the tasks. As mentioned above, the AI based system can communicate with a CRM system or a contact center system or application to accomplish the one or more tasks. In step 312, the AI based system tracks the status of the identified tasks to determine whether or not each is complete. When all of the tasks are identified as being completed, then the AI based system can determine that the incomplete interaction is now completed. Two examples are provided further below that help explain the type of tasks that can be identified and tracked.

Figure 4:
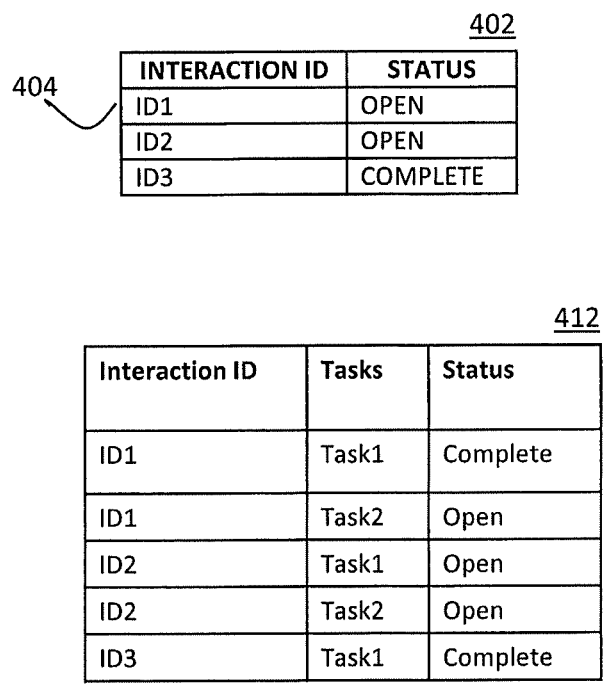
FIG. 4 illustrates two example tables that represent the type of information that allows the AI based system to track interactions and tasks in accordance with the principles of the present disclosure.

One of ordinary skill will recognize that there are a variety of functionally equivalent ways for the AI based system to track different interactions and different tasks. FIG. 4 illustrates two example tables that represent the type of information that allows the AI based system to track interactions and tasks in accordance with the principles of the present disclosure. One table 402 can be used to track an incomplete interaction. When the AI based system determines that an initial interaction is incomplete, then an entry 404 can be added to the table 402 that uniquely identifies the interaction and maintains a status indicator for that interaction. A second table 412 can be maintained that identifies the respective tasks associated with each of the different interactions. A status of each individual task is maintained as well. The CRM system and/or the contact center system described earlier can report the status of different tasks that the AI based system identified/created for those systems. The task information stored in the table 412 can include a detailed explanation of the task and who the responsible entity is for completing the task.

EXAMPLE SCENARIO 1 in which a user sends an email to a property management team about an apartment.

1. E-mail is received by the contact center from the user inquiring about the status of a prospective apartment.

2. A reply e-mail is generated that informs the user to direct inquiries like this one to "status@prop.com" and also informs the user of contact information for a particular person familiar with the inquiry.

3. Based on the reply e-mail the AI based system determines that the interaction is incomplete. In particular, the AI based system can determine that the text of the reply e-mail does not include direct answers to one or more questions contained in the user's email.

4. Based on the interaction being incomplete, the AI based system identifies two tasks that need to be completed.

5. For one task, the AI based system communicates instructions to an e-mail server or other communication server so that the other server forwards the user's e-mail to "status@prop.com" and also sends a notification to the user that the e-mail has been forwarded.

6. For the other task, the AI based system recognizes the user is registered with the system and communicates instructions to the contact center system to initiate an outbound call between the particular person identified in the reply e-mail and the user.

7. The AI based system receives acknowledgement back from the other systems that the instructions have been performed so that the status of the interaction can be changed from "open/incomplete" to "complete".

EXAMPLE SCENARIO 2 of a voice caller that disconnects.

1. A user calls the contact center and is connected with an agent.

2. The AI based system monitors the voice conversation to determine that the user asks about a loan status and details about a transfer request.

3. The AI based system monitors the voice conversation to determine that the agent informs the user that loan status inquiries are handled by the "Payroll" team and transfer request details can be provided by the "Human Resources" department.

4. The AI based system determines that the user terminated the contact.

5. Based on the conversation, NLP performed by the AI based system can indicate that this interaction is incomplete. The conversation content can be analyzed to determine that it appears the agent is instructing the user of items that the user can accomplish.

6. Additionally, the AI based analysis of the conversation can identify and create one or more specific tasks that, if performed, would complete the interaction.

7. For one task, the AI based system instructs the contact center system or application to conference the payroll department and the user.

8. For the other task, the AI based system instructs the contact center system to conference the human resources department and the user.

9. At some time in the future, each of the conferences are accomplished and that execution of those tasks is reported by the contact center system to the AI based system.

10. The AI based system updates the status of the interaction to indicate it is completed. It is possible that monitoring and analysis of one of the conference calls identifies additional tasks that need to be completed. The AI based system can associate the additional tasks with the initial interaction. Thus, even if the original two tasks are completed, the interaction can still be tracked as incomplete until all of the additional tasks are completed.

EXAMPLE SCENARIO 3 of a voice caller and the agent disconnects.

1. A user calls the contact center and is connected with an agent.

2. The AI based system monitors the voice conversation to determine that the user asks about a loan status and details about a transfer request.

3. The AI based system monitors the voice conversation to determine that the agent informs the user that loan status inquiries are handled by the "Payroll" team and transfer request details can be provided by the "Human Resources" department.

4. The AI based system determines that the agent terminated (disconnected from) the contact.

5. Based on the conversation, NLP performed by the AI based system can indicate that this interaction is incomplete. The conversation content can be analyzed to determine that it appears the agent is instructing the user of items that user can accomplish.

6. Additionally, the AI based analysis of the conversation can identify and create one or more specific tasks that, if performed, would complete the interaction.

7. For one task, the AI based system instructs the contact center system or application to dial out to the payroll department.

8. For the other task, the AI based system instructs the contact center system to dial out to the human resources department (which connects them to the user).

9. At some time in the future, each of the calls are accomplished and that execution of those tasks is reported by the contact center system to the AI based system.

10. The AI based system updates the status of the interaction to indicate it is completed. It is possible that monitoring and analysis of one of the conference calls identifies additional tasks that need to be completed. The AI based system can associate the additional tasks with the initial interaction. Thus, even if the original two tasks are completed, the interaction can still be tracked as incomplete until all of the additional tasks are completed.

In accordance with the principles of the present disclosure, an Artificial-Intelligence (AI) based system is contemplated that includes a contact center application as described above, and an AI based system or engine which can determine when an interaction is incomplete and create and/or identify tasks that are needed to complete the interaction. The tasks can then be tracked in order to track the overall status of the interaction.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A computer-implemented process, comprising:
   receiving an incoming contact at a contact center for an interaction between the contact center and a user;
   monitoring, by a computer, inbound communication and outbound communication between the user and an agent of the contact center;
   detecting, by the computer, that one of the agent or the user ends the contact;
   based on the monitored inbound communication and outbound communication, automatically determining, by the computer, whether the interaction is complete;
   when the interaction is an incomplete interaction, identifying by the computer, one or more tasks to complete the incomplete interaction; and
   tracking, by the computer, a status of the one or more tasks.

2. The computer-implemented process of claim 1, wherein the incoming contact is one of a voice call, a video call, a chat session, a social media message, a short message service (SMS) message, or an electronic mail.

3. The computer-implemented process of claim 1, further comprising:
   determining, by the computer, each of the one or more tasks is completed and then determining that the incomplete interaction is completed.

4. The computer-implemented process of claim 1, further comprising:
   assigning, by the computer, one of the one or more tasks to a separate computer application of the contact center.

5. The computer-implemented process of claim 4, wherein the separate computer application comprises a customer relationship management system.

6. The computer-implemented process of claim 1, wherein automatically determining whether the interaction is complete comprises performing artificial intelligence based analysis of at least one of the inbound communication and the outbound communication.

7. The computer-implemented process of claim 1, further comprising:
   requesting, by the computer, feedback from the user about the interaction.

8. The computer-implemented process of claim 1, further comprising:
   requesting, by the computer, feedback about the interaction from one or more of the agent, a supervisor of the agent, or an entity assigned one of the one or more tasks.

9. A system in a contact center, wherein an incoming contact is received at the contact center for an interaction between the contact center and a user, the system comprising:
   a memory storing executable instructions; and
   a processor in communication with the memory, wherein the processor when executing the executable instructions is configured to:
      monitor inbound communication and outbound communication between the user and an agent of the contact center;
      detect that one of the agent or the user ends the contact;
      based on the monitored inbound communication and outbound communication, automatically determine whether the interaction is complete;
      when the interaction is an incomplete interaction, identify one or more tasks to complete the incomplete interaction, and
      track a status of the one or more tasks.

10. The system of claim 9, wherein the incoming contact is one of a voice call, a video call, a chat session, a social media message, a short message service (SMS) message, or an electronic mail.

11. The system of claim 9, wherein when executing the executable instructions the processor is configured to:
   determine each of the one or more tasks is completed and then determine that the incomplete interaction is completed.

12. The system of claim 9, wherein when executing the executable instructions the processor is configured to:
assign one of the one or more tasks to a separate computer application of the contact center.

13. The system of claim 12, wherein the separate computer application comprises a customer relationship management system.

14. The system of claim 9, wherein automatically determining whether the interaction is complete comprises performing artificial intelligence based analysis of at least one of the inbound communication and the outbound communication.

15. The system of claim 9, wherein when executing the executable instructions the processor is configured to:
request feedback from the user about the interaction.

16. The system of claim 9, wherein when executing the executable instructions the processor is configured to:
request feedback about the interaction from one or more of the agent, a supervisor of the agent, or an entity assigned one of the one or more tasks.

* * * * *